US009262303B2

(12) United States Patent
Schalick et al.

(10) Patent No.: US 9,262,303 B2
(45) Date of Patent: Feb. 16, 2016

(54) AUTOMATED SEMICONDUCTOR DESIGN FLAW DETECTION SYSTEM

(75) Inventors: Christopher A. Schalick, Bedford, MA (US); Roderick B. Sullivan, Jr., Bedford, MA (US); Elliot H. Mednick, Salem, MA (US); Matthew D. Kopser, Hollis, NH (US)

(73) Assignee: ALTERA CORPORATION, San Jose, CA (US)

( * ) Notice: Subject to any disclaimer, the term of this patent is extended or adjusted under 35 U.S.C. 154(b) by 882 days.

(21) Appl. No.: 12/630,719

(22) Filed: Dec. 3, 2009

(65) Prior Publication Data

US 2010/0146338 A1    Jun. 10, 2010

Related U.S. Application Data

(60) Provisional application No. 61/201,028, filed on Dec. 5, 2008.

(51) Int. Cl.
*G06F 17/50* (2006.01)
*G06F 11/36* (2006.01)
*G06F 13/22* (2006.01)

(52) U.S. Cl.
CPC ........ *G06F 11/3664* (2013.01); *G06F 11/3648* (2013.01); *G06F 11/3656* (2013.01); *G06F 11/3692* (2013.01); *G06F 17/5054* (2013.01); *G06F 13/22* (2013.01); *G06F 17/5022* (2013.01); *G06F 17/5027* (2013.01); *G06F 2217/86* (2013.01)

(58) Field of Classification Search
None
See application file for complete search history.

(56) References Cited

U.S. PATENT DOCUMENTS

| | | | | |
|---|---|---|---|---|
| 5,425,036 | A * | 6/1995 | Liu et al. | 714/735 |
| 6,009,256 | A * | 12/1999 | Tseng et al. | 703/13 |
| 6,026,230 | A * | 2/2000 | Lin et al. | 703/13 |
| 6,199,031 | B1* | 3/2001 | Challier et al. | 703/14 |
| 6,466,898 | B1* | 10/2002 | Chan | 703/17 |
| 6,785,873 | B1* | 8/2004 | Tseng | 716/102 |
| 6,810,442 | B1* | 10/2004 | Lin et al. | 710/22 |
| 7,437,692 | B2* | 10/2008 | Oberlaender | 716/138 |
| 7,512,728 | B2* | 3/2009 | Tseng | 710/100 |
| 7,836,416 | B2* | 11/2010 | Schubert et al. | 716/106 |
| 7,941,771 | B2* | 5/2011 | Kaszynski et al. | 716/104 |
| 8,000,954 | B2* | 8/2011 | Schalick | 703/23 |
| 2004/0078179 | A1* | 4/2004 | Fuji et al. | 703/15 |
| 2004/0158788 | A1* | 8/2004 | Kaszynski et al. | 714/741 |
| 2005/0102572 | A1* | 5/2005 | Oberlaender | 714/29 |
| 2006/0253762 | A1 | 11/2006 | Schalick et al. | |
| 2008/0270103 | A1* | 10/2008 | Kaszynski et al. | 703/22 |
| 2011/0184713 | A1* | 7/2011 | Yang | 703/13 |

* cited by examiner

*Primary Examiner* — A. M. Thompson

(57) ABSTRACT

A simulation system enables comparison of a realized physical implementation against the simulation models that produce them, thereby detecting differences between an initial, logical design and the resulting physical embodiment. Errors introduced by an initial design, faulty Intellectual Property blocks, faulty programmable logic device silicon, faulty synthesis algorithms and software, and/or faulty place and route algorithms and software may be detected. As a result, the simulation system reflects both the accuracy of the actual implemented device with the capacity and performance of a purpose built hardware-assisted solution.

20 Claims, 15 Drawing Sheets

```
# ================================================================
# ERROR:   RocketVision found a mismatch between HDL and silicon
# signal   testbench.fpga.sub_blk_0.data_path.data_bus
# Time     6106010
# In HDL   0x0000000000000000000000000000000000000000
# In FPGA  0x1700000000000000000000000000000000010001
# ================================================================
```

FIG. 7

| Simulator value | Hardware value |
|---|---|
| 0 | 0 |
| 1 | 1 |
| U | 0 |
| X | 0 |
| Z | Z |
| W | 0 |
| H | 1 |
| L | 0 |
| - | 0 |

FIG. 9

```
// these signals are used to introduce delta delays
wire delay_1;
wire delay_2;
wire delayed_sig;

// non-blocking assignments insert delta delays before
// issuing synchronous inputs to design component RTL
assign delay_1     <= org_sig;
assign delay_2     <= delay_1;
assign delayed_sig <= delay_2;
```

FIG. 10a

```
architecture foo of design_component is

-- these signals used to introduce delta delays
signal delay_1     : std_logic;
signal delay_2..   : std_logic;
signal delayed_sig : std_logic;

begin
   -- assignments insert the delays before
   -- issue to design component RTL
   delay_1     <= org_sig;
   delay_2     <= delay_1;
   delayed_sig <= delay_2;
```

FIG. 10b

```
initial
  #20 async_sig_a = 1;

initial
  #20 async_sig_b = 1;
```

FIG. 10c

```
always @(posedge async_sig_a)
  signal1 <= signal2;

always @(posedge async_sig_b)
  signal2 <= !signal2;
```

FIG. 10d

```
task enqueue;
input      [1:0] async;
input      [0:0] val;
input      [0:0] mask;
input      [3:0] sync;
  begin
    gr_queue_async[gr_wptr]        = async;
    gr_queue_async_mask[gr_wptr]   = mask;
    gr_queue_async_val[gr_wptr]    = val;
    gr_queue_sync_val[gr_wptr]     = sync;
    gr_wptr                        = gr_wptr + 1;
    gr_empty                       = gr_wptr == gr_rptr;
    gr_depth                       = gr_depth + 1;
    gr_max_depth                   = (gr_depth >
gr_max_depth)
                                     ? gr_depth :
gr_max_depth;
  end
endtask task popqueue;
  begin
    gr_rptr  = gr_rptr + 1;
    gr_empty = gr_wptr == gr_rptr;
    gr_depth = gr_depth - 1;
  end
endtask
```

FIG. 10e

```
// Note either always block can be processed first when transitions
// on async_sig_a and async_sig_b occur at the same simulation time // Async queueing capture process for trigger signal 'async_sig_a'
always @(async_sig_a)
   enqueue(3, async_sig_a, 1'b1, {
                  1'd0,
                  1'd0,
                  sync_sig_1,
                  sync_sig_2
               });

// Async queueing capture process for trigger signal 'async_sig_b'
always @(async_sig_b)
   enqueue(2, async_sig_b, 1'b1, {
                  1'd0,
                  1'd0,
                  sync_sig_1,
                  sync_sig_2
               });
```

FIG. 10f

```
// This process issues input vectors to the implemented FPGA
// through a PLI call to $send_input_vector and retrieves
// implemented FPGA responses with the call to $get_output_vector reg async_sig_a_last;
reg async_sig_b_last;

always @(gr_wptr)
  begin: async_pins while(!gr_empty) begin
      in_sync     = gr_queue_sync_val[gr_rptr];
      in_async    = {
                      async_sig_a_last,
                      async_sig_b_last,
                      1'd0,
                      1'd0,
                      6'd0,
                      3'd0
                    };
      in_vec      = in_sync | in_async;
      in_mask     = gr_queue_async_mask[gr_rptr];
      in_mask     = in_mask << gr_queue_async[gr_rptr];
      in_mask     = ~in_mask;
      in_vec2     = in_vec;
      in_vec2     = in_vec2 & in_mask;
      in_vec2     = in_vec2 |
                    (gr_queue_async_val[gr_rptr] <<
gr_queue_async[gr_rptr]);
      popqueue;

$set_input_vector(in_vec);
      $set_input_vector(in_vec2);
      $get_output_vector(out_vec);
      $get_des_comp_vector(comp_vec);

des_comp_update <= comp_vec;
      async_sig_a_last = dut_in_vec2[12:12];
      async_sig_b_last = dut_in_vec2[11:11];

if(!gr_empty)begin
        delta_wait <= !delta_wait;
        @(delta_wait);
      end
    end
end
```

FIG. 10g

AUTOMATED SEMICONDUCTOR DESIGN FLAW DETECTION SYSTEM

RELATED APPLICATION(S)

This application claims the benefit of U.S. Provisional Application No. 61/201,028, filed on Dec. 5, 2008. The entire teachings of the above application are incorporated herein by reference.

BACKGROUND OF THE INVENTION

Programmable logic devices are used for a wide variety of custom hardware development. These devices contain configurable logic and circuits that can be programmed to implement a wide range of custom hardware designs and functions.

The configurable logic circuits are made up of a sea of primitive digital and analog elements that can selectively be wired to each other to implement a desired function.

Programmable logic devices are commonly known by the acronyms "CPLD" (complex programmable logic device) and "FPGA" (field programmable gate array). CPLDs are smaller devices, capable of selecting 10's or 100's of individual logical and/or electrical elements. FPGAs are typically larger devices capable of implementing 10's of thousands to millions of logical and electrical elements.

Some of the design tools required to implement FPGAs are proprietary and can only be obtained from the FPGA vendors. The size and density of the largest FPGA devices coupled with proprietary tool flows creates problems unique to FPGAs.

The largest programmable logic device vendors: Xilinx®, Altera® and Lattice Semiconductor® produce a number of different programmable device "families," each of which contain a number of different devices. Each device in a device family makes use of the same basic building blocks or primitive silicon elements such as programmable logical elements, phase locked loops, memories, I/O cells and other special purpose analog and digital circuits. The members in the device family vary the number of these primitive elements to provide a number of different cost alternatives based on required capacity of a user's designs.

For example, Xilinx® makes a range of devices in the Virtex®-5LXT family. This family contains members such as the XC5VLX30TFF323 and the XC5VLX330TFF1738. The XC5VLX30TFF323 has up to 172 I/O and 32 DSP blocks available to the user, whereas the XC5VLX330TFF1738 has up to 960 I/O and 192 DSP blocks available to the user. By the manufacturer's design, the electrical and logical functions the user can program into these I/O or implement with the DSP blocks are the same for the 2× devices. The manufacturer makes these functions identical for devices in the same device family so that a given design will operate the same in each device in the same family. This provides an upgrade path as the user's design grows in size, and re-usability of design components that target a specific device family.

In addition to primitive silicon elements, FPGA vendors offer pre-qualified macro designs for rapid development of popular logical and electrical functions. These macro designs are commonly referred to in the art as, "Intellectual Property" or "IP" blocks. These IP blocks are delivered to the user with functional models for the user to test their logical design's behavior and interaction with the IP blocks inside a logic simulation. In addition to the behavioral models, the IP block vendors provide physical models suitable for synthesis and place and route software to consume that are translated into physical implementations suitable to program into an FPGA device.

Design Process

The current state of the art for developing field programmable device designs is a serial, step-wise process. Generally accepted design flows follow a sequence of steps from register transfer level (RTL) coding or programming of hardware behavior to logic simulation to synthesis to place and route to hardware validation.

RTL coding is the process of describing logical design behavior by writing software files in a Hardware Description Language (HDL). Common HDL languages include very high speed integrated circuits (VHSIC) HDL (VHDL) and Verilog. This process requires the hardware designer to write code that captures desired behavior using a subset of the HDL language that is suitable for downstream processing. Downstream processes that consume RTL code include logic simulation and synthesis.

Logic simulation is a process that enables hardware designers to exercise their HDL design files with a software program. Simulator programs are intended to show the behavior of constructed hardware after it will be built. The simulators allow hardware designers to write tests and models to interact with their HDL designs and the logic simulator executes the tests against the HDL description of the design. Simulators include debugging tools that show signal behavior graphically as waveforms.

Synthesis is the process of converting HDL design files into a set of interconnected hardware primitives suitable to be placed inside a semiconductor device. This interconnected set of primitives is commonly called a netlist in the art. The conversion process requires the synthesis software to infer hardware elements from user supplied HDL code.

Synthesized netlists are passed to place and route tools. Place and route is the process of creating a 2× dimensional map of the primitives in the netlist and the wiring between them. This map corresponds to the spatial organization of components and wiring on the physical semiconductor device that implements the design. The outputs of place and route for FPGAs are files that are used to program the physical devices which implement the user's design.

SUMMARY OF THE INVENTION

Logic simulators by themselves provide no information to compare realized physical implementation against simulation models that produce them. Nor do logic simulators provide any mechanism to compare the differences between physical and logical designs. In addition, there are no commercially available LVS tools for FPGAs, therefore there is no advantage to running such tools for FPGA designs. Furthermore, hardware modelers provide no new information over that available with standard semiconductor test equipment.

Example embodiments of the present invention provide a simulation system that reflects both the accuracy of the actual implemented FPGA silicon with the capacity and performance of a purpose built hardware assisted solution.

In example embodiments of the invention, a logic simulator may be configured to operate a hardware description language (HDL) model, which includes a model design component, implemented in HDL code (e.g., RTL code), corresponding to at least a subset of a design under test. The HDL model may be configured to interface, via a conversion circuit, with an implemented field-programmable gate array (FPGA) implementing a design under test.

The HDL model further includes an interface corresponding to the inputs and outputs of said design under test. A collection module collects values on inputs and outputs observed within the FPGA implementing the design under test. A simulation module applies said values on inputs to the model design component. Further, a comparison module compares output of the model design component against the values on outputs observed within the FPGA. As a result, operation of the implemented FPGA may be verified against operation of an originating model design component defined in RTL or other HDL language.

In one aspect of the invention, example embodiments identify faulty simulation models for components of an FPGA design, faulty Intellectual Property blocks, faulty programmable logic device silicon, faulty synthesis algorithms and software, and faulty place and route algorithms and software.

In another aspect of the invention, example embodiments reduce the time to identify the root cause of a design fault by identifying the moment during a simulation when deviations between physical and behavioral models occur.

In yet another aspect of the invention, example embodiments reduce the time to identify the root cause of a design fault by identifying the location in the user's design where deviations between physical and behavioral models occur, without the user having to analyze behavior.

In still another aspect of the invention, example embodiments provide visibility to flaws introduced by modeling, synthesis, and place and route tools earlier than might otherwise occur. Time of detection resulting in lower costs of product development.

Further embodiments of the invention may be configured for interfacing with an implemented application-specific integrated circuit (ASIC) or other semiconductor device.

BRIEF DESCRIPTION OF THE DRAWINGS

The foregoing will be apparent from the following more particular description of example embodiments of the invention, as illustrated in the accompanying drawings in which like reference characters refer to the same parts throughout the different views.

The drawings are not necessarily to scale, emphasis instead being placed upon illustrating embodiments of the present invention.

FIG. 7 is a printout of a report resulting from comparison between a logical design and an implemented FPGA.

FIG. 9 is a table of example logic simulator input values and corresponding hardware input values.

FIGS. 10a-10g illustrate example software code (Listings 1-7) implemented in example embodiments of the present invention.

DETAILED DESCRIPTION OF THE INVENTION

Figure 1:
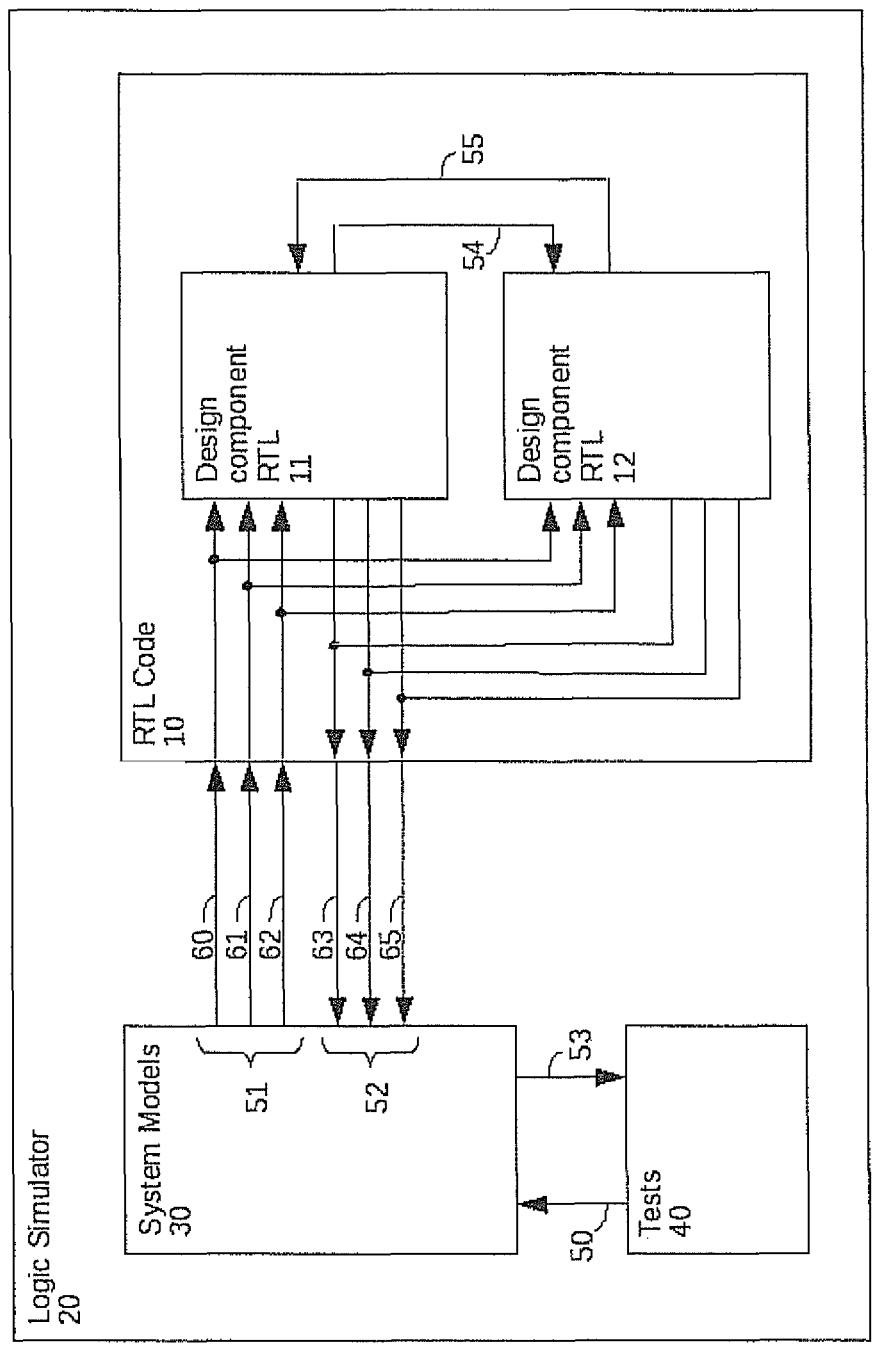
FIG. 1 is a block diagram of a logic simulator for simulation of a logic design.

A description of example embodiments of the invention follows.

The steps and processes below are described in the context of FPGA design flows. Those skilled in the art will recognize that these processes and concepts apply to other areas such as application specific integrated circuit (ASIC) and software design, as well as design and implementation of other semiconductor devices.

RTL Coding

The register transfer level (RTL) coding process involves hand-crafting code that captures the intent of the hardware designer. Coding is a manual process and thus error prone. Furthermore, RTL, being a hardware description language (HDL), is subject to interpretation by those writing the code and software tools that consume it. Perfect alignment of language interpretation is required to avoid introduction of inadvertent behavior in hardware designers' code.

The implications of misaligned HDL interpretation manifest as divergent behavior between intended design function and actual function results from simulation, synthesis and place and route software. These divergent results sometimes cascade through successive steps of the design flow. For example, a logic simulator may make decisions on resulting behavior based on the interpretation of signals having undefined values that differ from the behavior of a synthesized version of the same design. Logic simulators provide a special state for uninitialized or undefined values for convenience. Internal nodes in a synthesized digital design will be defined, therefore, they will assume a defined value in realized silicon circuits. Thus, it is challenging to deliver intended behavior in RTL code as perfect knowledge of the language and software tool interpretations of the language is required.

IP Usage

The use of IP blocks in advanced designs further complicates the accurate capture of the designer's intent in RTL code. IP is frequently delivered as encrypted files that are not human readable to protect the contents from copying. This makes coding for the interface between the IP and user's code challenging since assumptions can only be validated by use, not by inspection.

These encrypted files are commonly delivered as separate behavioral simulation models and physical implementation models for synthesis or place and route. The models for synthesis or place and route must be as accurate as possible to the IP designer's intent, to deliver intended function. It is common to provide these place and route models as netlists of interconnected gate level primitives, leaving no room for interpretation in downstream tools. These gate level descriptions simulate slowly and thus IP vendors are motivated by customers to deliver separate models to provide both faster simulation and accurate place and route. However, any differences between the two models causes discrepancies in behavior of realized hardware that are not detectable in simulation, making simulation inaccurate compared to implemented hardware.

The modeling issue described in the previous paragraphs applies equally to the models of FPGA primitive elements such as phase-locked loops (PLLs), I/O cells and memories. Any differences between the behavior of these models and the behavior of the silicon they are meant to model will manifest themselves as flaws that are not visible until silicon implementation is complete. These flaws are difficult to isolate since the hardware design is intended to perform a specific specialized function rather than being designed for debug. The debug process for implemented hardware will be described below.

Accuracy of models can also be a factor when the FPGA silicon itself has flaws. The simulation and place and route models may be perfect, but if the silicon has flaws that do not represent desired function, they again will not be visible until the hardware designer has completed development, rather than in logic simulation. This makes passing logic simulations a false positive indicator of design completion, since realized hardware will not behave as desired.

Accuracy of models and simulation software contribute to design flaws that go undetected until physical hardware is realized. This delay in fault detection is costly for hardware development.

RTL Synthesis

Hardware designers put their RTL code through a software translation called RTL synthesis, that converts the HDL code describing their RTL to an interconnected netlist of FPGA primitives or gates. This interconnected netlist of primitive gates represents an electrical description of physical elements used to implement the design in an FPGA. The conversion process is well understood in the art, but not standardized. Different synthesis software vendors will make different choices based on the same input designs, resulting in different outputs. While this affords synthesis software vendors room for differentiation, it creates an opportunity to introduce flaws as well. As noted above in the description of RTL coding, interpretation of the source RTL code is required to produce a synthesized result. Any differences in interpretation of the RTL code between the design author and the synthesis software vendor manifest as undesired behavior in synthesized designs. This inaccuracy is difficult to isolate since it requires knowledge of the complete synthesized circuit to detect, and these circuits are commonly 100,000 lines of readable text or greater.

Further complicating the language interpretation issue, advances in FPGA silicon have produced complex primitives for designers' use. These complex primitives must be properly handled by synthesis software or divergent behavior will be introduced in the synthesis process. New silicon advances are introduced every year, so synthesis vendors must constantly update their algorithms to keep up with new functions.

The challenges of language interpretation and advances in silicon result in synthesis software that introduces inadvertent design flaws in hardware designers' FPGA implementations. Synthesis software is also a human generated product—it is not uncommon for synthesis algorithms to simply make a mistake, again contributing to undetected faults prior to hardware design completion. Synthesis of large FPGA designs is time consuming, making correction of issues introduced during synthesis expensive for developers.

Place and Route

Place and route software takes the synthesized netlist of interconnected primitives and maps it to physical locations inside a physical FPGA. This software process places each primitive in a physical location, and uses programmable electrical wiring to interconnect them as described in the netlist. To help differentiate their products, FPGA vendors include aggressive optimization processes in place and route software. These optimizations are intended to produce faster, more compact implementations for a given design. While this represents an advantage to the FPGA vendors and their customers, it provides another opportunity for injection of flaws in a hardware designer's implementation. Any modification of the original design must be done in such a way as to preserve original design intent. While perfect tools are possible, the span of possible designs that can occupy a given FPGA device is practically infinite, so it is not possible to fully test whether the optimizations in place and route will or will not produce flaws for a given design. In practice, users find flaws introduced by place and route tools during hardware validation, detailed below.

Flaws introduced by place and route software are difficult to isolate as they can occur without warning anywhere in the resulting circuit. Given the size of current FPGAs with hundreds of thousands of registers, it is time consuming and difficult to identify where the flaw is introduced.

Hardware Validation

Once the RTL code is simulated, synthesized, placed and routed, the FPGA can be programmed on a piece of hardware. After programming, the hardware must be exercised to validate that the design meets specifications and operates as desired. Each step in the development process contributes human and/or machine generated faults. The purpose of the hardware validation process is to isolate and correct those faults.

In a hardware validation lab, programmed FPGAs are connected to system components they are designed to interact with. A common diagnostic technique is to use standard test equipment to monitor hardware for undesired behavior. This equipment (logic analyzers and oscilloscopes) can view signals entering and leaving the programmed FPGA. Because faults may be located anywhere within the programmed device, by the time they are visible at pins of the device the fault is usually long since past. Capturing activity on all of the pins of the device is not practical since PC boards must provide test points to attach test equipment and test equipment must have enough channels to observe hundreds of signals. Thus, it is difficult to recreate the conditions leading up to the fault occurrence in logic simulation.

To help analyze in-circuit conditions leading up to faulty behavior, FPGA vendors have provided logic analyzer functionality inside the FPGA devices. While this improves visibility into the source of faults in the design, it requires the user to speculate on the location of the faults and connect the logic analyzer to signals in that area. If the user's guess does not help identify the fault, the user must guess again and re-compile the FPGA. This iterative "guess and check" process is time consuming and thus expensive.

Validating hardware designs implemented in FPGAs is time consuming and difficult, increasing cost of hardware development.

Limitations of Existing Solutions

Logic Simulators

The work horse in a design verification process is the logic simulator. Logic simulators are flexible, popular and powerful. They provide debugging tools allowing the user to view detailed design behavior when stimulated with signal patterns that mimic behavior in the target system design. Debugging in a logic simulator provides visibility throughout the entire design and test environment without restriction. HDL logic simulators are well understood and have been commercially available for more than 20 years and are robustly tested.

While logic simulators are functional and reliable, the results they produce are only as accurate as the models they read. Further, for large designs they are slow since they must model millions of parallel events in software. Simulators also suffer from inconsistent interpretation of HDL languages as described above, making switching between simulators and matching synthesized design results to HDL simulation results error prone. Logic simulators provide no information beyond the models passed to them about the physical implementation of designs being simulated. Logic simulators can be coupled to simulation accelerators or logic emulators, but the combination provides no new information about a physical implementation of a device being modeled.

Layout vs. Schematic Tools

LVS or "layout vs. schematic" tools compare an IC layout produced by place and route software against the netlist passed in to the layout. This provides a way to identify whether changes to the electrical design made during place and route have altered the behavior of the circuit. LVS is commonly used in ASIC design flows, but not in FPGA flows.

LVS checks functional equivalence at a transistor level and connectivity level between a layout and a netlist. No checking is performed (and no insight provided) by netlist optimizations done by the place and route tool prior to the comparison. For FPGAs, there is no practical way to run LVS as the place and route tools and resulting transistors are not visible to the user. FPGA vendors providing proprietary place and route software can provide LVS software but currently do not.

Hardware Modelers

Hardware Modelers provide a hardware platform to stimulate semiconductors connected to a logic simulator. They provide a pattern memory that can be loaded from simulation and played against the semiconductor under test. The resulting outputs of the tested device can then be transferred back to simulation. The entire contents of the pattern memory are played against the device during each simulation cycle, resulting in 1 new output value for simulation. Simulation can then advance and provide 1 new input value which is added at the end of the pattern memory. In this way, a semiconductor component can be stimulated and monitored with a logic simulator.

While this method provides information about how the component behaves from the outside, no information about behavior inside the device is available. Further, there is no mechanism to compare the simulation models used to develop the semiconductor device against the behavior of the device itself.

Hardware modelers require the user to configure the modeling platform for their specific design. This is a cumbersome, time consuming process.

Simulation Accelerators

Simulation accelerators provide a proprietary hardware platform which, when connected to a logic simulator running on a computer, speed up logic simulation run times. While simulation accelerators take many forms, all convert the simulation models passed in to them into a proprietary form that maps to their hardware. Examples of accelerators include special purpose microprocessors and memory systems as noted in the section on prior art.

Simulation accelerators provide no advantage over logic simulators if the simulation models passed in to them contain faults. While faster, the behavior of an accelerator matches logic simulation since it takes as input the same HDL source. By contrast, faults injected in an FPGA implementation by synthesis, place and route, IP models, or silicon defects are neither visible in a logic simulator nor a simulation accelerator.

Further, if the conversion from original design RTL code to the proprietary format of the accelerator is flawed, simulation accelerators will, in fact, introduce faults into the design under test.

Logic Emulators

Logic emulators provide a hardware platform to model the behavior of a digital semiconductor design prior to building the semiconductor. This platform can be physically connected to the hardware system that will house the semiconductor once it is built. This enables hardware designers to view the behavior of their design operating inside the electrical environment it is designed to run in.

Logic emulators can also be used as simulation accelerators by connecting the emulator to a logic simulator which provides stimulus and captures response from the emulated design.

When connected to a target hardware system, the test stimulus the design receives is more accurate than logic simulation alone, which merely provides a model of the test stimulus the design will see. However, no additional information is provided by logic emulators in terms of the accuracy of the physical design of the semiconductor. Consider the faults injected by synthesis, place and route, IP modeling and silicon defects, none of which will be demonstrated by logic emulators which use their own unique processes to realize a design.

Further, no mechanism is provided by a logic emulator to compare such faults against the RTL source models that did not demonstrate them.

Example embodiments of the invention provide a way to compare the behavior of functions of one or more components in a semiconductor design with the behavior of the simulation models used to develop that same silicon implementation. The silicon implementation may differ in behavior from the simulation models used in its development for reasons described above.

The comparison is performed by stimulating a realized FPGA device as directed by a software program, and at the same time monitoring activity inside the realized FPGA at the boundaries of one or more components of the FPGA design. The activity observed inside the FPGA at the inputs of these components is issued inside the software program to the inputs of the RTL code for said components. The software program calculates the response to the input stimulus from the RTL code for each of these components. The resulting responses are then compared against the values observed at the outputs of the corresponding components inside the FPGA device. Any differences are reported to the user along with the time and location of the fault.

Example embodiments of the present invention ensure proper behavior and comparison of the simulated RTL components. These embodiments are detailed below with reference to the figures.

FIG. 1 illustrates a conventional logic simulation for a typical FPGA design. FIG. 1 illustrates conventional elements as known in the art and usage of logic simulation for typical FPGA designs.

The RTL code for an FPGA design being developed is shown labeled 10 in FIG. 1. This RTL code is executed in a logic simulator 20, which is capable of evaluating the RTL code's response to stimulus provided by system models labeled 30 in FIG. 1. HDL logic simulators referenced above are exemplary of software program 20 (logic simulator and software program may be used interchangeably herein).

The system models 30 are responsive to tests 40, via control signals 50. The system models 30 in response to control signals 50 issue stimulus consistent with desired hardware system function to FPGA RTL code 10 via input signals labeled 51 in FIG. 1.

Logic simulator (20) or similar software program executes RTL code (10) in response to input signals (51). In response to changes on input signals (51), RTL code (10) produces output signals, labeled 52, which may be monitored by system models (30). System models (30) generate status of the current execution of RTL code (10) and return it to tests (40)

via status signals, labeled 53. Tests (40) can then determine whether RTL code (10) is behaving as desired by inspecting status signals (53).

Input signals (51) may include clocks, labeled 60, asynchronous signals, labeled 61, and synchronous signals, labeled 62. Clocks (60), asynchronous signals (61), and synchronous signals (62) are representative of classes or types of input signals as commonly known in the art of digital design and may each be made up of one or more signals when present. Note that composition of input signals (51) is design dependent; that is, different hardware designs may have different numbers of each listed type of signal. In FIG. 1, clocks (60) are signals that trigger activity in RTL code (10) on an edge or signal transition from high to low, low to high or both. Asynchronous signals (61) are signals that may cause responses from RTL code (10) on any edge or transition. Synchronous signals (62) are signals that cause no change in RTL code (10) state without a corresponding transition on clocks (60) or asynchronous signals (62).

Output signals (52) similarly include different types of signals, labeled for convenience as 63, 64, and 65 in FIG. 1. Output signals (52) may be clocks (63), asynchronous (64) or synchronous (65) in nature.

Input signals (51) may be connected inside RTL code (10) to components of FPGA design (150). Two such components are shown by way of example, labeled 11 and 12. Design components (11) and (12) are exemplary of conventional FPGA design elements as described above which may be primitive FPGA cells, blocks of user RTL code, IP blocks or other like source as known in the art. Though two such components are shown, 1, 2 or more components may exist in the RTL code. Design components (11) and (12) may be further interconnected via signals labeled 54 and 55. Signals (54), (55) may be of any signal class: clocks, synchronous, or asynchronous as described previously. Connections between design components (11) and (12) are exemplary of typical FPGA components but are not required for the current invention to function and are provided for explanation only. Note that connections between input signals (51) and design components may or may not be shared as shown in the figure. Each individual design component (11) or (12) may connect to 1, some or all of said input signals (51). Similarly, output signals (52) may be connected to 1, some or all design components in the RTL code.

Figure 5:
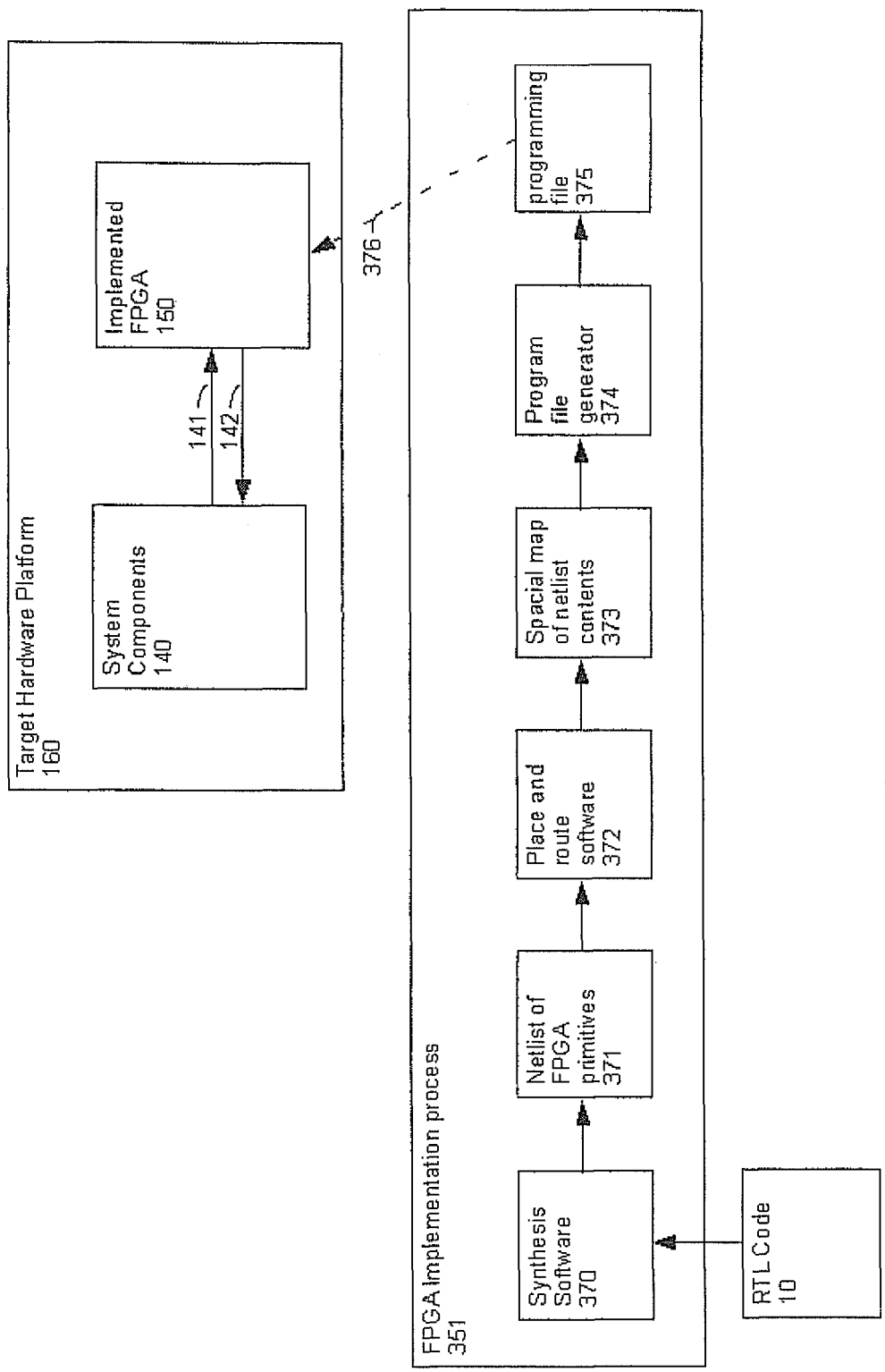
FIG. 5 is a flow diagram illustrating a process of implementing a logic design.

FIG. 5 further shows the processes used to program physical FPGA (150). The physical FPGA is to be implemented in a target hardware platform 160 (interchangeably referred to as hardware system), for which a hardware designer is developing a design component 10 (in RTL or other HDL code) using logic simulator 20. Hardware system 160 includes a target physical FPGA, labeled 150, as well as other system components 140, that interact with the physical FPGA (150) via hardware equivalents of input signals (51) and output signals (52), labeled 141 and 142 respectively. System components (140) may include common digital and analog components such as oscillators, memories, microprocessors, data converters, etc. as known in the art of hardware design. The system models (30) may emulate the behavior of system components (140) as accurately as possible to provide a view in software simulation of the expected behavior of physical FPGA (150) as predicted by exercising design component 10 interacting with system models (30).

In addition to usage in software simulator (20), design component (10) is passed to synthesis software (370) to convert RTL code (10) into a netlist of interconnected FPGA primitives, labeled 371. Netlist (371) is then passed to place and route software, labeled 372, to prepare a spatial map, labeled 373, corresponding to physical locations of the interconnected FPGA primitives and wiring in netlist (371). This spatial map (373) is passed to a programming file generator, labeled (374), that produces a programming file, labeled 375, that is suitable to program physical FPGA (150) in hardware system (160) by conventional mechanisms as shown in phantom, labeled 376. The steps outlined from RTL synthesis (370) to programming file (375) generation are understood by those skilled in the art as an FPGA implementation process 351. Though these steps are common and generally accepted other processes or process steps similar to those shown in the process (351) may be used to convert software representations of FPGA designs (10) to a form suitable for implementation in hardware (150).

Figure 2:
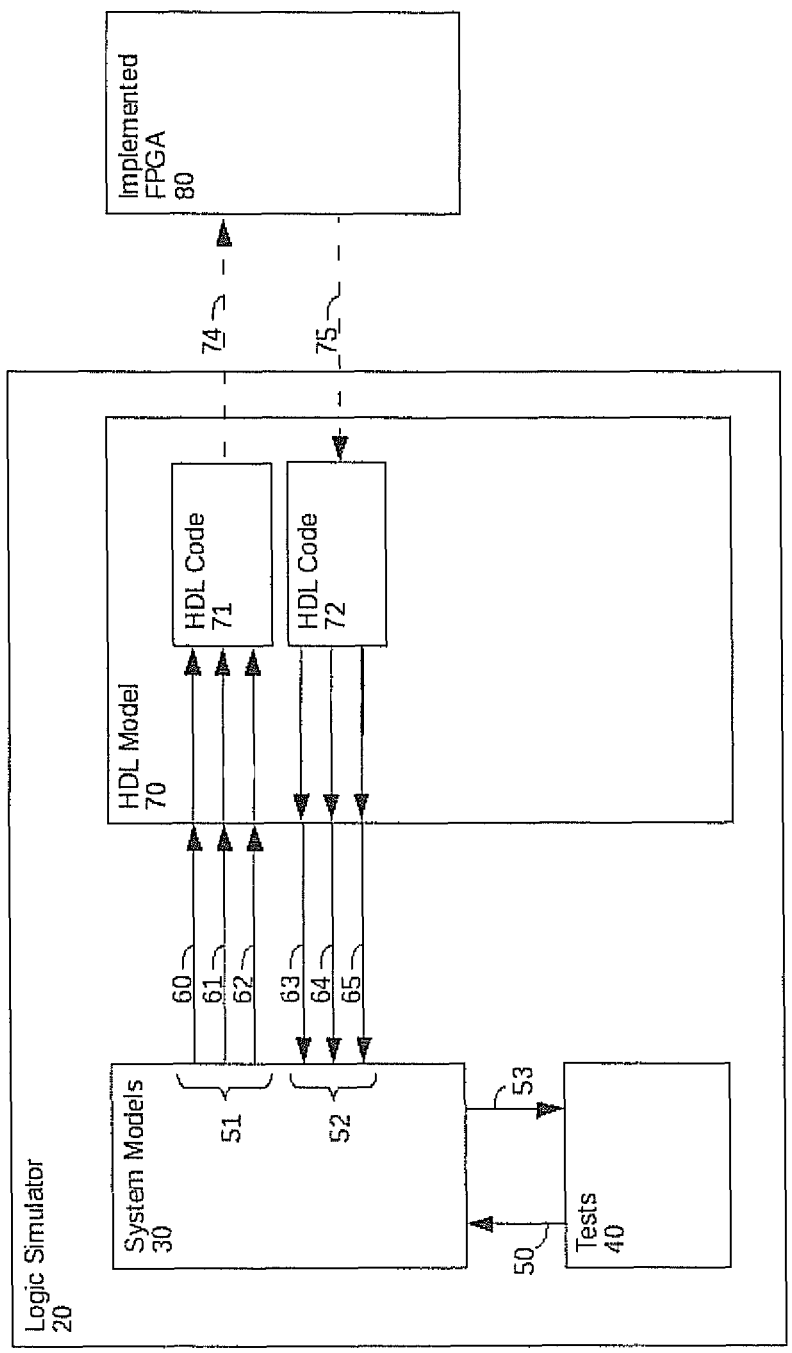
FIG. 2 is a block diagram of a logic simulator configured to interface with an implemented field-programmable gate array (FPGA).

FIG. 2 illustrates a logic simulator (20), system models (30) and tests (40) comparable to the system shown in FIG. 1, but rather than interacting with RTL code (10) for the user's FPGA design, they interact with a pin compatible HDL model 70. HDL model 70 has the same number of input, output and bidirectional signals entering and exiting RTL code (10) with the same names, sizes and directions as the I/O ports in RTL code (10), so that the interface to system models (30) is identical to that in RTL code (10). HDL model (70) captures input signals (51) with Conversion module 71 (implemented in HDL code) and transfers them to the input pins of an implemented FPGA, labeled 80. HDL model (70) further collects values on the output pins of implemented FPGA (80) by calls from Collection module 72 and transfers them to the output signals (52). These transfers are designated in phantom in FIG. 2 via issuing inputs, labeled 74, and capturing outputs, labeled 75.

Systems for capturing, converting and transferring signals between logic simulator 20 and implemented FPGA 80 are known in the art and are described briefly below. Such circuits are disclosed in U.S. patent application Ser. No. 11/375,521, filed Mar. 14, 2006, now U.S. Pat. No. 8,000,954 and related provisional patent application 60/662,427, filed Mar. 16, 2005, the entire teachings of which are incorporated herein by reference. Generally, such systems use a circuit that mirrors the connections of the FPGA being tested, said circuit being hereafter referred to as a bus functional model (BFM) circuit 110. The BFM circuit 110 is operatively coupled to software running in conversion module 71, and collection module 72 with conventional means such as programming language interface (PLI), direct programming interface (DPI) or VHDL programming interface (VHPI) software coupled to a conversion circuit 100 connected to the BFM circuit.

Transferring data from conversion module 71 to the input pins of FPGA (80) is performed by first converting signal values from simulation to a form suitable for delivery in hardware. Logic simulator (20) may be capable of representing signal values in multi-valued states, including high, low, pulled high, pulled low, high impedance, unknown and the like as known in the art, for example, as standardized by the IEEE as multi-value logic 9 values (MVL-9). FPGA (80) may have a reduced set of such values to which it is sensitive, such as high, low, and high impedance. Conversion from 9 state values in software simulator (20) to 3 state hardware values can be performed by a translation such as that shown in table 1. Conversion module 71 first converts values on signals (51) to a form FPGA 80 can accept, for example as per table 1, then forms them together in aggregate into a single block of data, referred to here as an input vector. Said input vector is ordered such that the receiving circuit (110) can align individual signals from the received block of data with corresponding electrical versions of said signals, operatively connected between BFM circuit (110) and FPGA (80) on pins for signals (60a), (61a), (62a).

Said block of data is transferred from said Conversion module 71 through simulator software interfaces as PLI or VHPI as known in the art, to driver software (not shown) outside the logic simulator 20. Said driver software operates within the operating system of a computer (not shown) running the logic simulator 20 such that the driver is enabled to communicate directly with hardware attached to the computer. Conversion circuit 100 is coupled to the computer, and the combination of driver software and conversion circuit 100 are responsible for converting software values to hardware signals. Once software values are converted by circuit 100 to hardware signals, they are issued from conversion circuit 100 to BFM circuit 110 for transfer to FPGA 80. As described above, alignment of transferred software values to corresponding hardware signals is performed by maintaining a consistent ordering between software signals and hardware signals, when viewed in aggregate.

Figure 4:
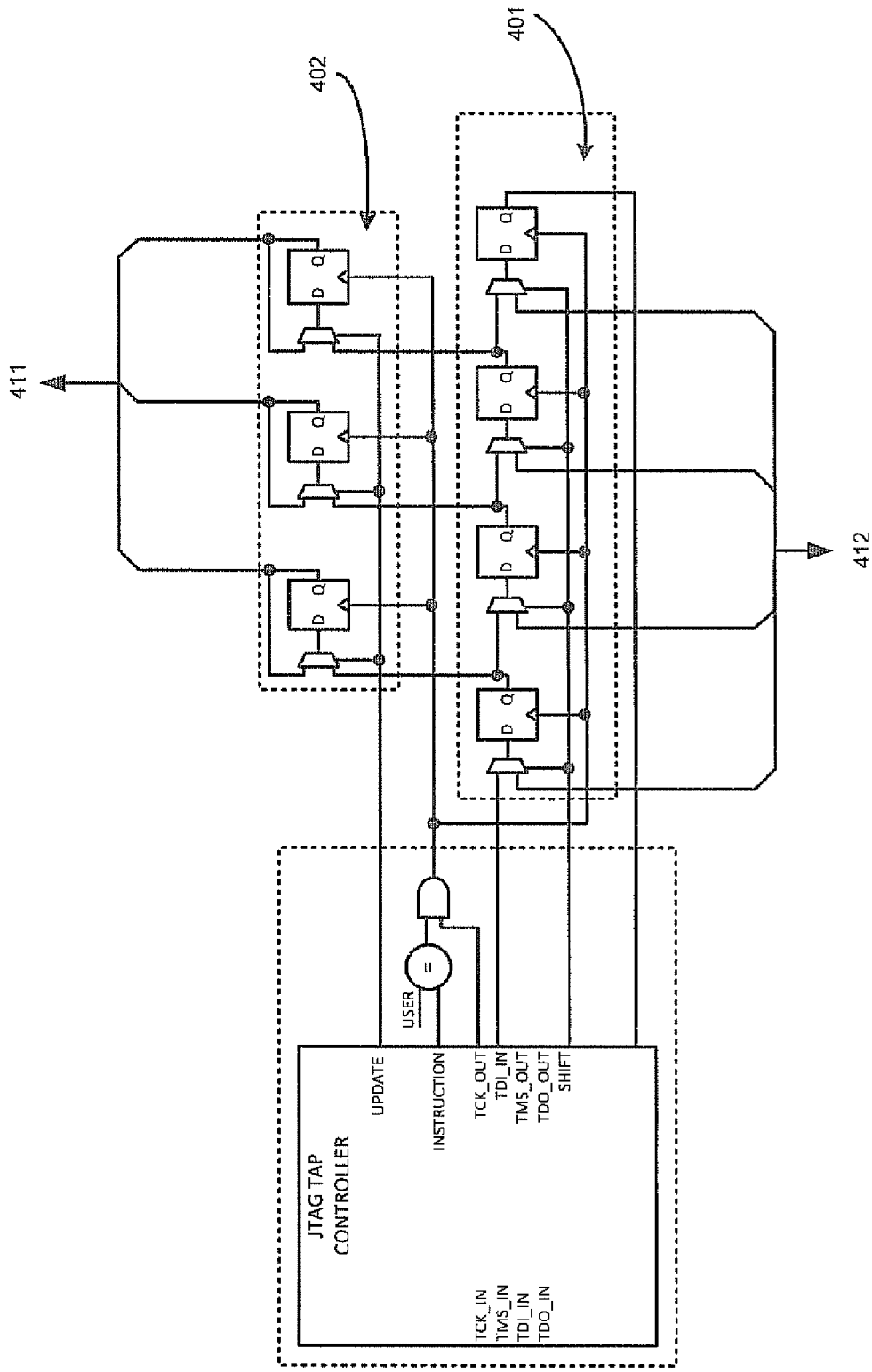
FIG. 4 illustrates a circuit providing an interface and register for debugging data.

FIG. 4 illustrates one example circuit using Joint Test Action Group (JTAG) scan chains to receive the signals issued by conversion circuit 100 when BFM circuit 110 is implemented with an FPGA. Said block of data is preceded by a JTAG instruction register load with the USER code, issued by said driver software, which enables communication with circuits inside the FPGA implementing said BFM circuit 110, by activating the equality check shown in FIG. 4. Following the instruction load, aggregated software signals in the input vector are sent through the conversion circuit as a JTAG data register load, which shifts the input vector into the scan chain in FIG. 4. When the JTAG data register load completes, the shift register's 401 content is transferred into the capture register 402 shown in FIG. 4. Said capture register outputs form the aggregate hardware version of said input vector and are labeled 411 and may be referred to as "control point outputs." Corresponding portions of said "control point outputs" are wired to pins of the BFM circuit which are coupled to corresponding pins of FPGA 80 such that after said JTAG data register load, input signals (51) have been converted to electrical equivalents and driven onto corresponding pins (60a), (61a), (62a) of FPGA 80.

The process described above of transferring signals from Conversion module 71 to the inputs (60a), (61a), (62a) of FPGA (80) is designated by line (74), shown in phantom in FIG. 2.

Collection of values on the output pins of FPGA 80 by Collection module 72 may be performed in similar fashion as the transfer from Conversion module 71 to FPGA 80 but in reverse, as follows. Data transfer is preceded by issuing a JTAG instruction register load with the USER code from said driver software, which enables communication with circuits inside the FPGA implementing said BFM circuit (110), by activating the equality check shown in FIG. 4. The circuit shown in FIG. 4 loads the values present on signals labeled 412 and referred to as "control point inputs," into the shift register 401 prior to a JTAG data register load. Thus, issuing the input vector a second time shifts out the values on the "control point inputs," which are operatively connected to output signals of FPGA (80). The outputs (63a), (64a), (65a) of FPGA 80 are connected inside said BFM circuit 110 to said "control point inputs" in aggregate, referred to as the output vector.

The output vector data exiting the shift register is returned to the conversion circuit 100, which returns it to said driver software. Said driver software returns the output vector values to said simulator software interface, such as PLI or VHPI. Said PLI or VHPI returns the data to Collection module 72. Returned values in said output vector are then assigned by Collection module 72 to outputs 52 of HDL model 70. The ordering of the aggregated signals in the output vector captured at "control point inputs" corresponds to the ordering of signals in Collection module 72, such that captured hardware signals on FPGA 80 outputs (63a), (64a), (65a) are transferred to corresponding outputs (63), (64), (65) of HDL model 70.

Implemented FPGA 80 thus responds to input signals (51) and output responses are captured at the output pins of FPGA 80 and retrieved by HDL code, labeled 72, inside HDL model 70, again with a system as in U.S. patent application Ser. Nos. 11/375,521 or 60/662,427. HDL model (70) delivers implemented FPGA (80) outputs to system models (30) via output signals (52). In this manner, implemented FPGA is tested by system models (30) and tests (40) with logic simulator 20.

The FPGA device (80) in FIG. 2 is selected to be in the same FPGA family as the target physical FPGA (150) in hardware system (160). In this way, no conversion is necessary of the FPGA design source in RTL code (10) comprised of one or more FPGA primitives, blocks of RTL code and IP blocks. In addition, the same synthesis software (170) and place and route tools (172) can be used that are used to implement the FPGA (150) in the hardware designer's target hardware (160) in implementation process (151). Thus, all design faults present in HDL code (10), injected by IP block modeling, language interpretation and algorithms in synthesis software (170) and optimizations done by place and route tools (172) in process (151) as well as silicon faults in physical FPGA (150) are preserved and visible in the behavior of FPGA (80) inside software simulator (20).

Figure 3:
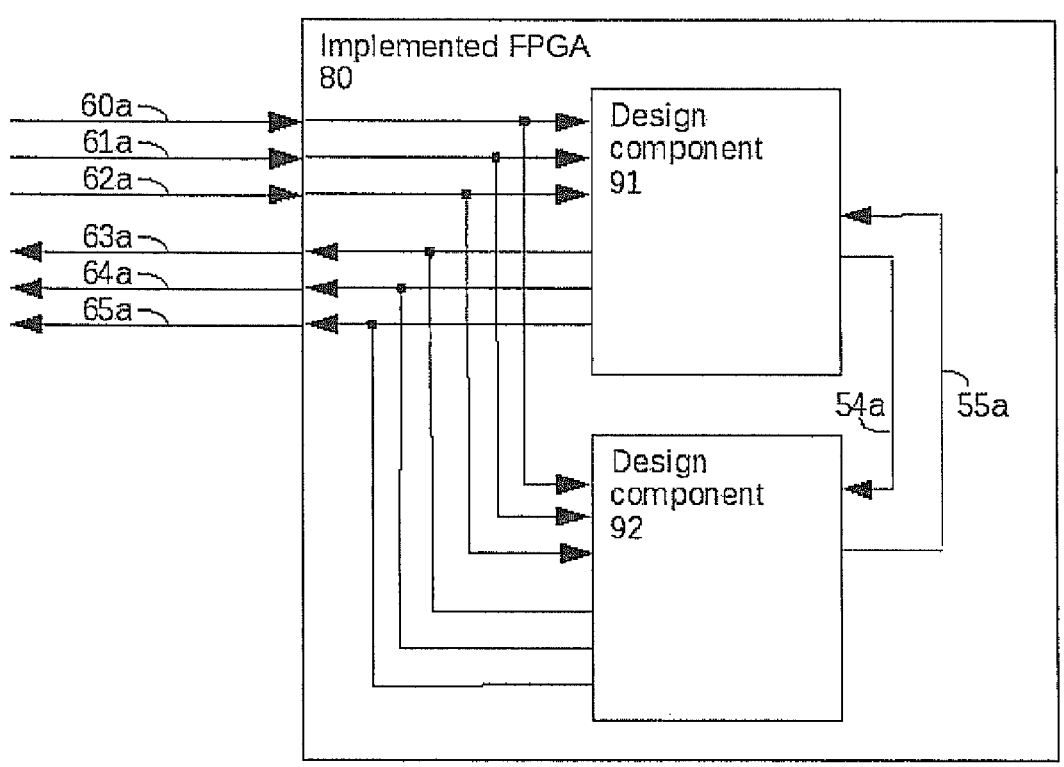
FIG. 3 is a block diagram of an implemented FPGA.

FIG. 3 shows Implemented FPGA (80), resulting from synthesis, place and route and programming of a physical FPGA from RTL code (10) through implementation process (151). Design component (91) corresponds to conversion of design component RTL (11) to physical, electrical equivalents by implementation process (151). Design component (92) corresponds to conversion of design component RTL (12) to physical, electrical equivalents by implementation process (151). Input signals, labeled 60a, 61a, 62a correspond to conversion of input signals (60), (61) and (62) respectively to physical, electrical equivalents by implementation process (151). Output signals, labeled 63a, 64a, 65a correspond to conversion of input signals (63), (64) and (65) respectively to physical, electrical equivalents by implementation process (151). Signals connected between design components (91) and (92), labeled 54a, 55a correspond to conversion of signals (54) and (55) respectively to physical, electrical equivalents by implementation process (151). Implemented FPGA (80) is thus a physical, electrical implementation of RTL code (10).

Figure 3A:
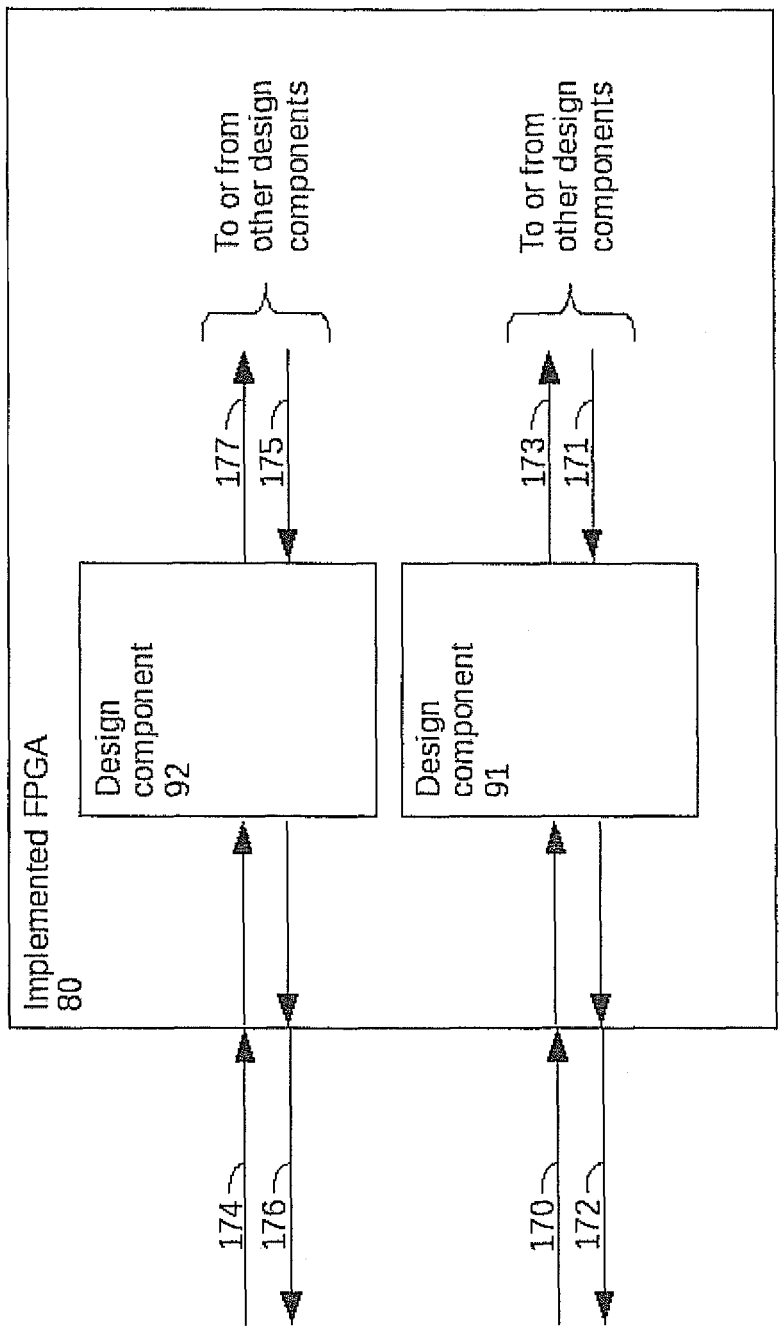
FIG. 3a is a block diagram of an implemented FPGA.

For clarity, input signals connected to design component (91), including some or all of input signals (60a), (61a), (62a) from I/O pins of implemented FPGA (80) will be referred to in aggregate, labeled as 170 in FIG. 3a. For clarity, input signals to design component (91) from output signals (55a) of other design components as connected in RTL code (10), such as component (12), will be referred to in aggregate, labeled as 171 in FIG. 3a.

For clarity, output signals from design component (91), including some or all of output signals (63a), (64a), (65a) to I/O pins of FPGA (80), will be referred to in aggregate, labeled as 172 in FIG. 3a. For clarity, output signals (54a) of design component (91) as connected in RTL code (10) to other design components, such as design component RTL (12), will be referred to in aggregate, labeled as 173 in FIG. 3a.

The designations (170), (171), (172), (173) are made by way of example for signal connections to component (91). Similar designations can be made for signal connections to any and all design components in implemented FPGA (80). Such designations for component (92) are shown as (174), (175), (176), (177).

Figure 3B:
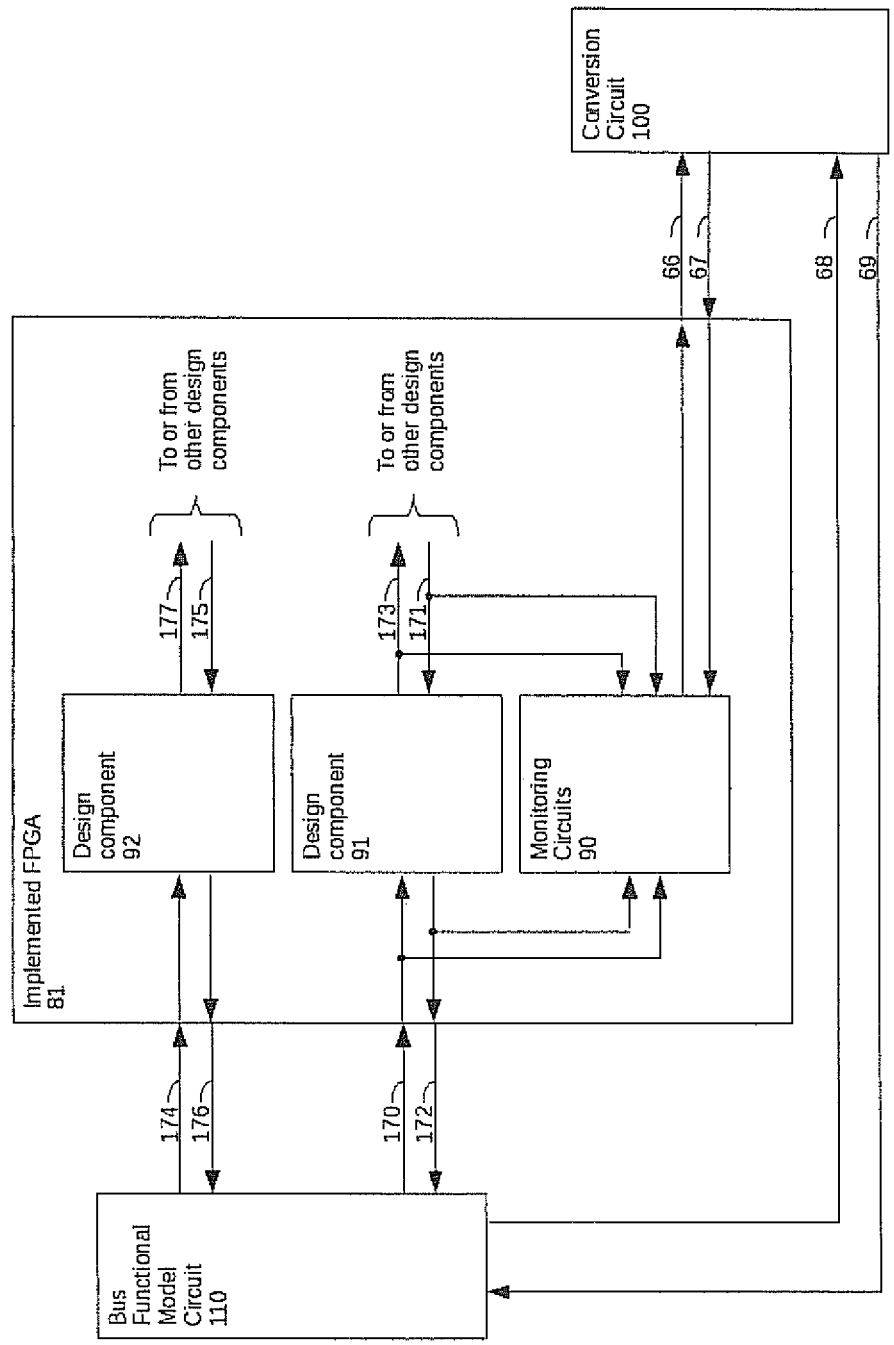
FIG. 3b is a block diagram of an implemented FPGA including monitoring circuits.

FIG. 3b shows an enhanced implemented FPGA (81) with monitoring circuits (90) added in unused programmable logic. Monitoring circuits (90) capture the state of signals entering or exiting design component (91) via input signals (170), (171) and output signals (172), (173) and deliver said state to simulator interface signals, labeled 66. Monitoring circuits (90) deliver said simulator interface signals (66) carrying the state of signals entering and exiting design component (91) in response to requests issued by HDL code, labeled 73, via simulator request signals, labeled 67. Requests from Simulation/comparison module 73 are made through standard simulator interfaces (PLI, DPI, VHPI) through conversion circuit (100) as shown in phantom labelled (76). Delivered state is transferred to Simulation/comparison module 73 through standard simulator interfaces (PLI, DPI, VHPI) by conversion circuit (100) as shown in phantom labelled (77).

These monitoring and simulator interface circuits can take a variety of forms. The operation of the circuit shown in FIG. 4 and its interaction with HDL code, PLI and/or VHPI software, software drivers and conversion circuits similar to that described above for the BFM circuit. Using the circuit in FIG. 4 in monitor circuits (90) similar to that described for the BFM circuit (110) with the exception that the JTAG instruction and data register loads are issued to FPGA (81) rather than BFM circuit (110). Monitor circuits (90) are connected in FPGA (81) with signals (170), (171), (172), (173) to the "control point inputs" shown in FIG. 4. As described above, maintaining consistent ordering in Simulation/comparison module 73 and wiring to "control point inputs," provides Simulation/comparison module 73 a mechanism to assign values received from monitoring circuits (90) to shadow inputs (180), (181) and connect them to corresponding input signals of design component RTL (11) inside HDL model (120).

After HDL model (70) issues input signals (51) to implemented FPGA (80) with transfer (74), Simulation/comparison module 73 requests collection of state from monitoring circuits (90) via simulator request signals (67). In response to simulator request signals (67), monitor circuits (90) load the scan chain (93) in the monitoring circuit with the values of all inputs (170), (171) and outputs (172), (173) of design component (91) as detailed in U.S. patent application Ser. No. 11/375,521. The scan chain is then shifted out to a receiving circuit, labeled 100, which is coupled to software receiving data in Simulation/comparison module 73. Another technique for monitoring design component (91) suitable for the current invention is to connect all inputs (170), (171) and outputs (172), (173) of design component (91) to otherwise unused pins of the FPGA device (80) for capture by BFM circuit (110). BFM circuit (110) can be enhanced to receive signals on corresponding unused pins such that signals (170), (171), (172), (173) are captured with FPGA (80) outputs with transfers as described from Collection module 72.

Figure 6:
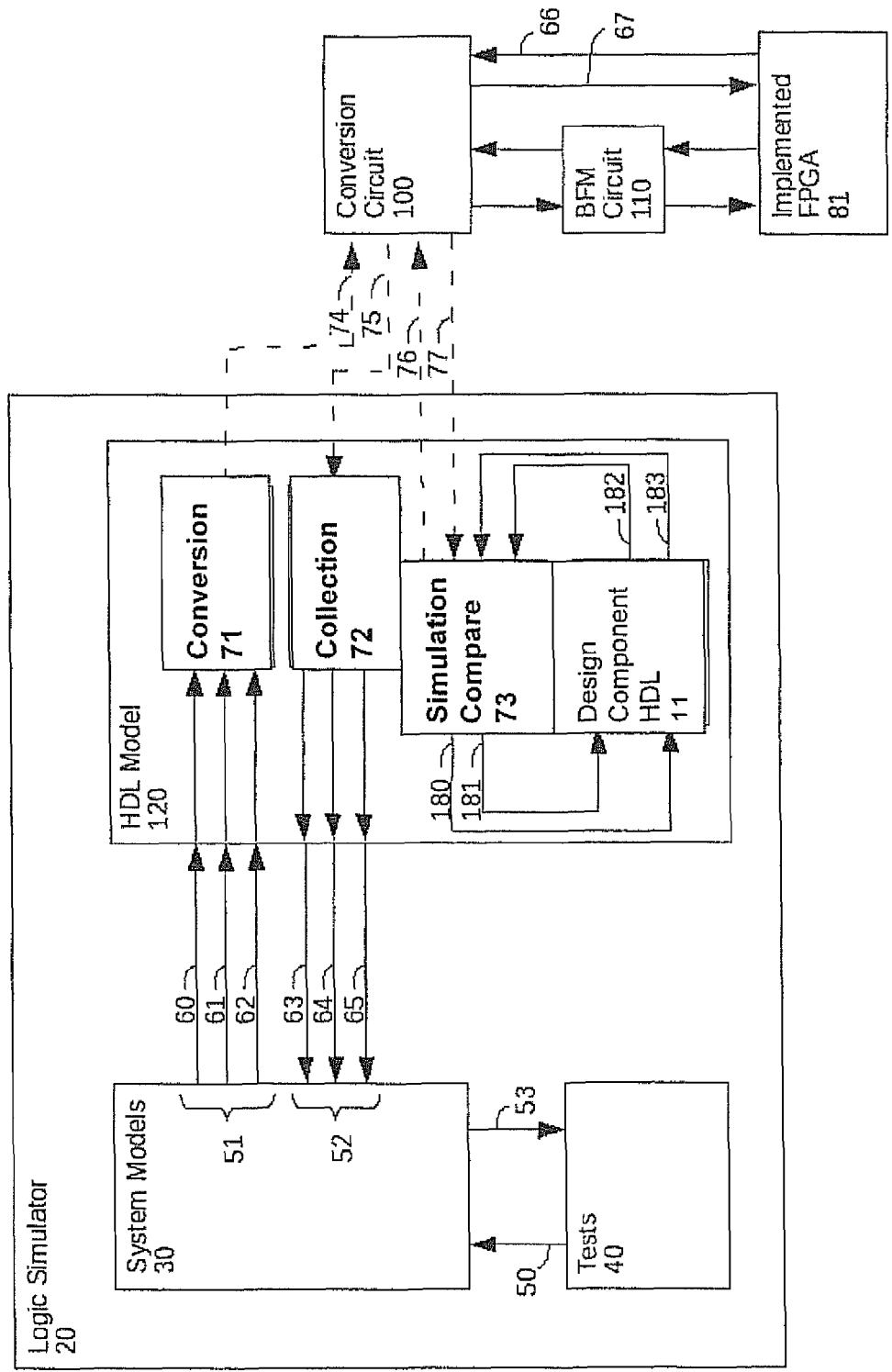
FIG. 6 is a block diagram of a logic simulator configured to interface with an implemented FPGA.

FIG. 6 illustrates a logic simulator 20 interfacing with an implemented FPGA 81 via a conversion circuit 100. An enhanced HDL model 120 may interface with system model 30 in a similar manner as HDL model 70 in FIG. 2. In addition, HDL model 120 includes design component 11, implemented in RTL or other HDL code, instantiated inside it. On collection of values on the inputs (170), (171) of design component (91) from monitoring circuits (90), simulation/comparison module 73 issues said values on inputs (170), (171) to corresponding inputs of design component 11 via shadow input signals (180), (181). Shadow input signals (180) correspond to inputs (170) from I/O pins of FPGA (81). Shadow input signals (181) correspond to inputs (171) from other design components inside FPGA (81), such as design component (92).

Logic simulator 20 calculates the response of design component 11 to shadow input signals (180), (181) and issues said results on design component 11 outputs, connected to shadow output signals (182), (183) corresponding to outputs (172), (173) respectively in FPGA (80). Values on shadow output signals (182), (183) are then compared to corresponding values on outputs (172), (173) from design component (91) in implemented FPGA (81) as retrieved by simulation/comparison module 73 inside HDL model (120). Simulation/comparison module 73 performs the comparison and reports differences to the user with the name of any individual signals that differ in output signals (172), (173), along with the hierarchical location of said differing signals inside the design component 11, and the simulation time at which the differences occur. An example of the report made to the user of said reported differences is shown in FIG. 7. As shown in FIG. 7, the report to the user identifies a monitored block inside the FPGA (81) with a signal that behaves differently in the design component than in FPGA (81). For reference to the figures, design block (91) corresponds to "fpga.sub_blk_0.data_path" in the report, and output signal (182) corresponds to "data_bus." Information about the signal name and hierarchical location of the signal is encoded in Simulation/comparison module 73, which remains silent when no mismatches occur.

To preserve the timing relationship of clocks (60), asynchronous (61) and synchronous (62) signals issued by HDL model (120) to design component RTL code (11), HDL model (120) can transfer values from monitoring circuits (90) to shadow input signals (180), (181) in many ways. Example embodiments of two such sequences will be detailed in the following paragraphs.

The first example sequence, referred to herein as "event based transfer," transfers values from HDL model (120) to the FPGA (81) whenever any input signal (51) changes to HDL model (120). Conversion module 71 then transfers input vector values to FPGA (81) similar to that described above. Following updates at the FPGA (81) input pins (60a), (61a), (62a) as described above, data is retrieved from the monitor circuits (90) for all inputs (170), (171) and outputs (172), (173) of design component (91). This makes the logic simulator 20 responsible for relative sequencing of synchronous, asynchronous and clock signal inputs. This also results in unnecessary communication overhead.

The second example sequence is to transfer values from monitoring circuits (90) whenever any of the clocks (60) or asynchronous signals (61) to HDL model (120) change. By waiting to transfer data between HDL model 120 and conversion circuit 100 until a clock (60) or asynchronous signal (61) changes, transitions on synchronous signals (62) can be sampled once en masse, rather than once per transition of any synchronous signal (62). This can result in substantial performance benefit in simulation. This second example sequence will be referred to as "cycle based transfer."

In the cycle based transfer approach, whenever clocks (60) or asynchronous signals (61) transition, input signals (51) to HDL model (120) are transferred to FPGA (81) by Conversion module 71 via conversion circuit (100) in the following sequence. The synchronous inputs (62) are first sampled en masse and issued to conversion circuit (100). This captures all changes occurring on test signals and establishes a coherent state of synchronous hardware inputs to FPGA (81) on signals (62a). Values on signals (170), (171), (172), (173) are then collected by Simulation/comparison module 73 retrieval via communication with conversion circuit (100). No changes on (172), (173) output signals of design component (91) are anticipated as this would necessitate said signals being asynchronous in nature or clocks. Transitions on clocks (60) or asynchronous signals (61) are then transferred by Conversion module 71 to FPGA (81) via conversion circuit (100) and BFM circuit (110). These transitions may cause output signals of design component (91) to change. Simulation/comparison module 73 then retrieves values on signals (170), (171), (172), (173) as described above. Collection module 72 retrieves values on FPGA (81) output pins by communicating with BFM circuit (110) via conversion circuit (100) and issues resulting data to HDL model (120) outputs (52).

In both event based transfer and cycle based transfer sequences, Simulation/comparison module 73 compares values on the outputs of all monitored design units at the simulation cycle when any change in clocks (60) or asynchronous signals occurs. Thus, the data compared is checked prior to software simulator (20) calculating the output results of simulated design component RTL (11) resulting from changes on clocks or asynchronous signals.

Though in the above description, only design component (11) was monitored with monitoring circuits (90), it should be clear to those skilled in the art that one, some or all such design components in FPGA (81) can be monitored and thus validated against corresponding design component RTL functions.

In one example embodiment of the invention, the relationships between synchronous signals and clocks and asynchronous signals are maintained in two distinct areas. The first area is the relationship between synchronous inputs to the FPGA itself, shown in the figures as (62), along with clocks and/or asynchronous signals to the FPGA, shown as (60) and (61) respectively. This area will be referred to as "primary input coherence." The second area is with signals transferred between design components within the FPGA, shown as (54) and (55). This area will be referred to as "component to component coherence."

When design component RTL (11) receives synchronous inputs from other design components, such as design component RTL (12), changes to the values seen at said synchronous inputs will be seen at the same time that changes on the clocks or asynchronous signals are seen. This results from design component (91) responding virtually instantaneously to changes on clocks and/or asynchronous inputs compared to the time Simulation/comparison module 73 takes to collect values. Changes on clocks and asynchronous inputs to design component RTL (11) inside HDL model (120) come from monitored values of said clocks or asynchronous signals inside FPGA (81). Thus by the time Simulation/comparison module 73 has collected states of signals connected to design component (91), output signals of design component (91) have already changed to new states. When design component RTL (11) operates in RTL code (10) inside software simulator (20) as shown in FIG. 1, changes on clocks and asynchronous signals are processed before values that result from those changes are allowed to occur.

That relationship is preserved in example embodiments of the current invention by first selecting the clocks and asynchronous signals on design component RTL (11), and inserting delta delays on all other inputs to design component RTL (11), thus ensuring synchronous signal inputs retrieved by HDL code (93) from design component (91) arrive after the clocks or asynchronous signals transition. Delta delays may be inserted by assigning values to a number of intermediate signals before delivering signals to their destination. One example of such intermediate HDL assignments in Verilog is shown in FIG. 10a (Listing 1). The original signal to be delayed is referred in the listing as "org_sig." This signal is representative of synchronous signals received by a monitored design component (91) from other design components in the FPGA, such as shown in (54a). Before Simulation/comparison module 73 issues the value retrieved from monitoring circuits (90) to design component RTL (11), "org_sig" is assigned to several intermediate wires. Each wire assignment adds an additional delta delay to "org_sig." In the example in listing 1, "org_sig" is assigned three delta delays resulting in "delayed_sig." The value on "delayed_sig" is then issued to design component RTL (11) via shadow input signals (181) as signal "delayed_sig" in Listing 1.

It will be clear to those skilled in the art that the technique described can be implemented in other HDL languages such as Vhdl or SystemC. The code in Listing 1 is exemplary of the mechanism disclosed using the Verilog language. The code in FIG. 10b (Listing 2) shows the equivalent function using the Vhdl language rather than Verilog.

In a further refinement of the cycle based approach, Conversion module 71 contains a queueing system (300) to capture and control the distribution and sequencing of arriving changes in multiple asynchronous signals or clock signals. This queueing system stores signal transitions in a set of first-in, first-out queues. Such queues are well understood by those skilled in the art and commonly referred to as "FIFOs." For clarity, asynchronous signals and/or clock signals will be described hereafter as "trigger signals." The description below details the refined cycle based approach to sequencing signals from Conversion module 71 to implemented fpga (80) and refers to the process diagram in FIG. 8.

The code in FIGS. 10c-10g (Listing 3, 4, 5, 6 and 7, respectively) is shown in the Verilog HDL language though it should be clear for all code examples in this description that other HDL languages may be used to perform described functions or said functions may reside in the software driver as described above.

Unless explicitly coded to occur in a specific sequence, when trigger signals change at the same simulation time unit in logic simulator (20), the simulator will select an arbitrary order to process the trigger signal changes.

For example, consider the two trigger signals, "async_sig a," and "async_sig_b." The listing shown in Listing 3 is exemplary of HDL code that generates a race condition between async_sig_a and async_sig_b transitioning at simulation time 20. The race condition means that the simulator is allowed by definition of the HDL language to legally process the updates on async_sig_a or async_sig_b in any order at simulation time 20. Further, processes that are sensitive to transitions on one trigger signal that races a second trigger signal may or may not see the outcome of transitions on the second trigger signal.

For example, consider running the same design and test sequence with contemplated race conditions on trigger signals with two different logic simulators. Though each simulator supports the behavior of the language standard each may produce different results as the standard defines order of execution of race conditions as arbitrary. Though both simulators produce valid and legal results according to the HDL language standard, the results differ. That is, one simulator may choose to process the events resulting from changes on async_sig_a before the events resulting from changes on async_sig_b at time 20. Another simulator may make the opposite choice. These race conditions are common in the field of HDL design and recognized and understood by those skilled in the art.

Further consider an example circuit to be place in implemented FPGA (81) which is sensitive to both trigger signals async_sig_a and async_sig_b. If the state of said example circuit is determined by the order in which the trigger signals are processed as shown in the example code in Listing 4, then the signal race creates a "race condition" as known in the art, resulting in unpredictable behavior. The signal called "signal2" has a deterministic output regardless of races on trigger signals. The state of signal "signal1" as shown in the listing however cannot be pre-determined when rising edges of async_sig_a and async_sig_b race.

The queueing system (300) contemplated here in Conversion module 71 to capture trigger signals resolves such race conditions by forcing trigger signal transitions to be stored in queue entries one at a time and releases them to the downstream consumers in an orderly, serial fashion. Thus if five trigger signals transition simultaneously, rather than issuing one input vector with all five trigger signals changing, the queueing system enables issuing five inputs vectors each with one trigger signal changing. This enforces strict ordering between arrival of trigger signals at implemented fpga (81) and subsequent arrival of trigger signals to both implemented FPGA (81) and design component RTL (11).

Figure 8:
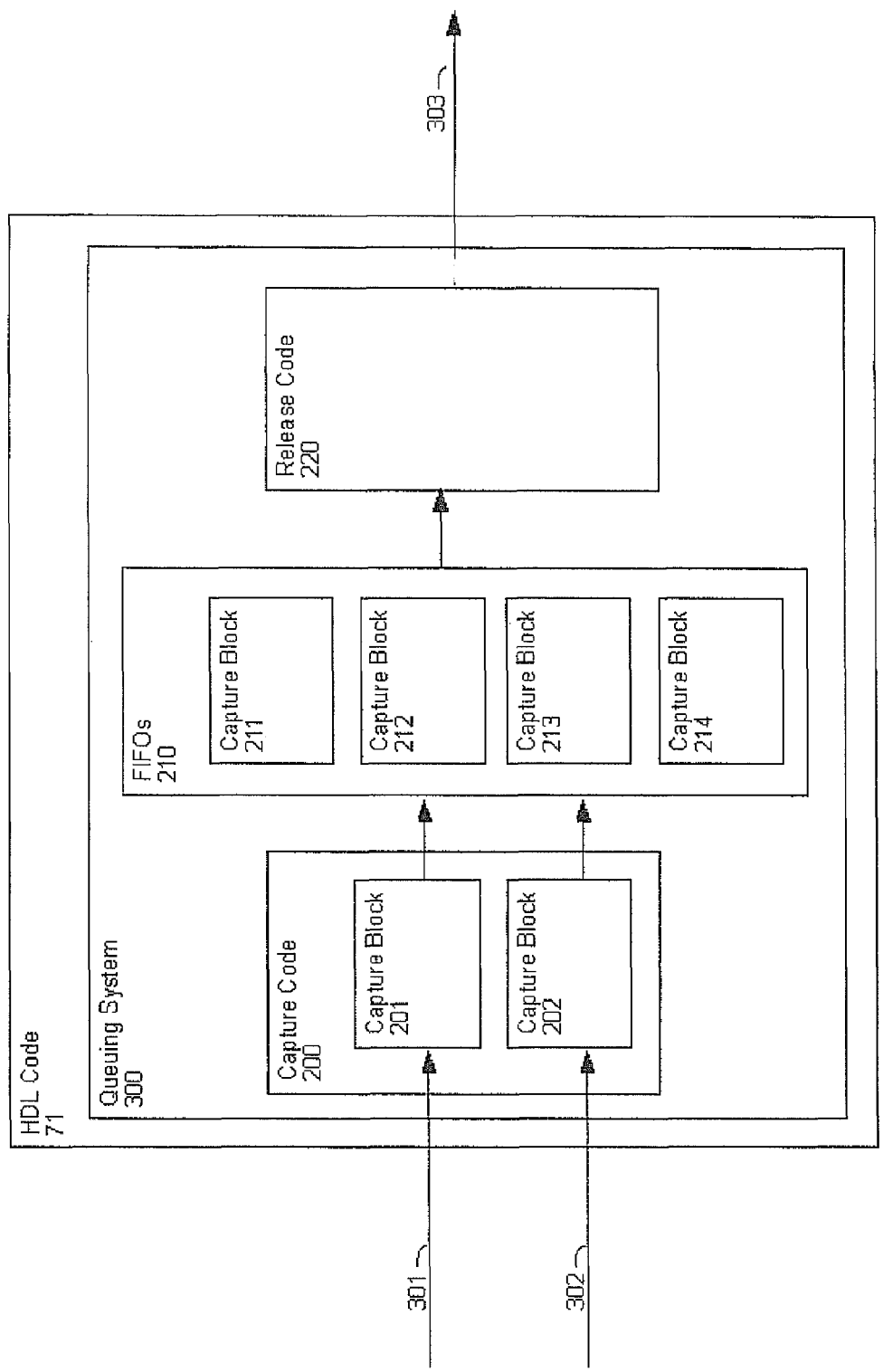
FIG. 8 is a block diagram of a queuing system implemented in a hardware description language.

The trigger signal transition capture code shown in FIG. 8 labelled (200) is implemented in the disclosed example on a per-trigger signal basis. That is, each trigger signal has a unique process described by a block of HDL in Conversion module 71 for capturing transitions. FIG. 8 shows two such blocks of capture code labelled 201 and 202. These capture blocks are operatively coupled to capture transitions on async_sig_a and async_sig_b respectively. Though two such processes are shown, the system works for 2 or more such trigger signals. Conversion module 71 performs more functions as described in previous sections than just the described queueing system, though these other functions are not shown in FIG. 8.

All the trigger signal transition capture HDL code blocks (200) run in parallel with respect to simulation time. Parallelism is a fundamental operating principal of conventional logic simulator software (20) and is understood by those skilled in the art. Exemplary code for capturing trigger signal transitions is shown in Listing 6 to capture the two trigger signals, "async_sig_a," and "async_sig_b." The separate always blocks in Listing 6 are each responsive to one of the trigger signals and call a Verilog task called "enqueue."

The enqueue task accepts information about the trigger signal transition and the non-trigger signal states (62) at the moment the trigger signal changes. The enqueue task places the received values into a set of FIFOs labelled (210). In the presented example there is a FIFO each for the value to which the trigger signal transitions (211), a unique numeric index of the trigger signal (212), the vector mask for the trigger signal (213), and the values of the non-trigger signals (214) at the time the trigger signal change occurred. These FIFOs (210) are all written once for each call to enqueue. An example of the enqueue function is shown in Verilog HDL in Listing 5, where the signal "gr_queue_async" holds the index of the trigger signal (212), "gr_queue_async_mask" holds the vector mask for the trigger signal (213), "gr_queue_async_val" holds the trigger signal transition (211) and "gr_sync_val" holds the values of the non-trigger signals (214). The purpose and function of the values stored in these queues is described below. Though disclosed as individual queues, the information passing through the queues can be stored as fields within a single aggregate queue (the queues are all loaded once per enqueue operation and unloaded once per de-queue or queue pop operation).

The enqueue function is shown in the example as a Verilog task with blocking linear code which does not advance simulator time. This requires logic simulator (20) to execute the enqueue task in a blocking fashion so that the enqueue operation is atomic and cannot be interrupted by any other executing HDL code. This atomic operation is a result of the queue code being implemented with blocking HDL constructs that infer blocking, atomic execution as know by those skilled in the art. Though the enqueue function is called from several trigger capture blocks operating in paralell, each call to enqueue completes its function before another block's call can be processed as dictated by said blocking linear code and the HDL language standard. Before returning to the calling code, the enqueue function stores the values in queues and updates the write pointer, "gr_wrptr" and queue empty flag, "gr_empty."

The queue empty flag and write pointer are coupled to a process in Conversion module 71 that unloads the trigger signal queueing system. The queue write pointer, "gr_wptr," in the listings, is operatively coupled to a queue release process (220) that unloads data from the queueing system. Exemplary code for this process is shown in Listing 7 for the example with two trigger signals. This process is scheduled to be executed by logic simulator (20) when the queue write pointer is updated by the enqueue function. Though it is scheduled to execute by the enqueue task call, the enqueue task may be called multiple times by multiple transitions on racing trigger signals before the release process starts.

The release process (220) maintains in HDL variables the values previously issued to implemented FPGA (81) for all trigger signals. Once entered, the release process examines the queued values for the oldest entry remaining in the queue and creates an input vector to be sent to implemented FPGA (81). This input vector (called in_vec in Listing 7) is computed with the values of all trigger signals previously issued to implemented FPGA (81) along with the values of non-trigger signals (62) which were stored in oldest entry in the queue (214). The resulting computed input vector invec is then copied to a second input vector called invec2. The release process (220) then forms a mask from the trigger mask value in the oldest queue entry (213). This mask is used to preserve all values in the second input vector invec2 except the bits occupied by the previous value of the trigger signal, which are zeroed out. The trigger signal is identified by the numeric index in the oldest queue entry (212). Once the previous value of the trigger signal is masked out of the invec2 input vector, it is replaced in invec2 with the value stored in the oldest queue entry (211) for the trigger signal value as shown in Listing 7. These two input vectors are required to preserve primary input coherence as disclosed earlier.

After computing the input vectors, the oldest entry in the queue is no longer needed and is removed by a call to "popqueue" shown in Listing 5. The popqueue routine shown in Listing 5 advances the queue read pointer such that the second oldest entry in the queue prior to being called becomes the oldest entry in the queue. The popqueue routine then updates the queue empty pointer and returns without advancing simulation time.

Once the input vectors are computed for current synchronous input values and previous trigger signal values in in_vec and current synchronous input values and the new state of the trigger signal in in_vec2, the input vectors are applied in sequence to the implemented FPGA (81) as shown in Listing 7 with calls to $set_input_vector which is exemplary of a Verilog PLI call. By definition changes to synchronous inputs (62) cause no output changes without an associated change on trigger signals (60) and/or (61). Input vector in_vec is first issued to implemented FPGA (81) followed by input vector in_vec2. Following the issue of input vectors, the values on implemented FPGA (81) outputs (66) are collected by Collection module 72 with a call to Verilog PLI routine $get_output_vector as shown in Listing 7. The values on signals entering and exiting design component (91) are then collected by Simulation/comparison module 73 in signal "comp_vec" shown in Listing 7 with a call to Verilog PLI routine $get_des_comp_vector. The values in comp_vec are processed by Simulation/comparison module 73 and issued to design component RTL (11). This issue to design component RTL (11) is not shown in the listed but operates as previously disclosed by inserting delta delays on synchronous signals to preserve component to component coherence with respect to design component RTL (11).

There is an exception to the above sequence when synchronous inputs to design component RTL (11) are coupled directly to inputs (62) of RTL code (10). In this case, the synchronous inputs are treated as trigger signals and passed through the queuing system accordingly to preserve primary input coherence. Note that in the extreme case, all inputs to design component RTL (11) are coupled directly to inputs (62) of RTL code (10), in which case the queueing system reverts to the function as disclosed in the "event based" sequence above.

To prevent logic simulator (20) from collapsing the application of multiple trigger signals to design component RTL (11), an additional block of code is executed prior to re-entering the queue release HDL block loop. This code shown in Listing 7 assigns a value to a register with non-blocking assignment which infers a delta delay in logic simulator (20) before the register value is updated. The code then waits for the update to occur before advancing, forcing all scheduled events for the next simulation cycle to have been processed, allowing time for updated trigger signals to reach design component RTL (11) inside HDL model (120) prior to processing further entries in the trigger signal queue. Before exiting the process, the release code then evaluates the state of the transition queue and if there are further entries to process it re-enters and repeats the sequence described for the oldest entry in the queue after the one just processed.

Thus the disclosed queueing system issues changes on trigger signals one at a time in serial fashion to both implemented FPGA (81) and design component RTL (11), though several trigger signals may have transitioned at the same time in logic simulator (20) prior to passing through the queueing system shown in FIG. 8.

If both sig_a and sig_b are scheduled to change at simulation time 20 as shown in Listing 3, the disclosed queueing system stores the queue entries one at a time in serial fashion. Additional code (220) inside Conversion module 71 that is responsive to changes in the depth of the queue then pulls one transition at a time out of the queue and issues it to implemented FPGA (81) and retrieves state from implemented FPGA (81) outputs and design component (91) via transitions (75) and (77) as described above.

Release process (220) in Conversion module 71 pulls only one transition out of the queue at a time and issues the associated signal transitions to both implemented FPGA (81) and by extension design component RTL (11). By doing so, the sequence of trigger signals issued to both hardware and RTL (11) is identical, thus resolving contemplated race conditions in a deterministic fashion.

By eliminating races, any differences between the outputs of design component RTL (11) and design component (91) thus identify defects in design, design processing or simulation software, design IP or silicon as described above. This enhanced sequence offers the combined performance benefits of "cycle based" sequencing and the resolution of race conditions in "transition based" sequencing.

The race condition resolution technique described about with the trigger signal capture and queueing events are described with Verilog HDL operating in Conversion module 71. This implementation is exemplary and it should be clear to those skilled in the art that such race condition resolution techniques may be performed in other languages or in code operating in driver software (referenced above) operatively connected to PLI or VHPI code.

Without a queuing system such as that disclosed above, changes in multiple trigger signals that occur at the same time would result in unpredictable behavior from both the implemented fpga (81) and the HDL models (11) of design components running in simulation. When trigger signals change in logic simulator (20) events are scheduled in logic simulator (20) in response to the those changes. Those events include the disclosed events that issue input vectors to the disclosed implemented FPGA (81). However, when multiple trigger signals change at the same time, more than one trigger signal may update in logic simulator (20) prior to the scheduled input vector transfer. This behavior causes the Conversion module 71 that transfers input vectors to implemented fpga (81) to issue changes to more than one trigger signal to the implemented FPGA (81) via signals (60a) and/or (61a) simultaneously. This creates a race condition in implemented FPGA (81) which is sensitive to changes on said trigger signals. When two such circuits in FPGA (81) are sensitive to changes on different trigger signals that race as described and are operatively connected to each other such that the order of the racing trigger signals arrival determines the state of the circuits, the resulting behavior is not predictable and thus comparing against the behavior of HDL models (11) is unpredictable.

Further, the receipt of trigger signals at design component RTL (11) from monitoring circuits (90) and Simulation/comparison module 73 as described will present the same simultaneous changes on the trigger signals as issued to implemented FPGA (81). This creates a secondary race in logic simulator (20) when executing design component RTL (11) which as described above is contemplated to be sensitive to multiple trigger signals (60) and/or (61). This secondary race is an HDL simulator race as described previously.

By utilizing the queueing system as described, both the race condition at implemented FPGA (81) and the race condition at design component RTL (11) are eliminated by enforcing an arbitrary but consistent ordering between the issue of each trigger signal to both (80) and (11).

It should be understood that the block diagrams of FIGS. 1-3, 3a-b, 6 and 8 and the flow diagrams of FIG. 5 are examples that can include more or fewer components, be partitioned into subunits, or be implemented in different combinations. Moreover, the flow diagrams and components of the block diagrams may be implemented in hardware, firmware, or software. If implemented in software, the software may be written in any software language suitable for use in logic design and implementation as illustrated in FIG. 5. The software may be embodied on any form of computer readable medium, such as RAM, ROM, or magnetic or optical disk, and loaded and executed by generic or custom processor(s).

While this invention has been particularly shown and described with references to example embodiments thereof, it will be understood by those skilled in the art that various changes in form and details may be made therein without departing from the scope of the invention encompassed by the appended claims.

What is claimed is:

1. A design under test verification system comprising:
a simulator operative to implement a first component in hardware description language (HDL), wherein said first component corresponds to said design under test, wherein said first component is operative to convert a value from a register transfer level model into an input value in HDL;
an interface component coupled to said simulator and operative to communicate said input value to a second component via a conversion module that converts said input value in HDL into an input signal for said second component, wherein said second component comprises an integrated circuit that is implementing said design under test, wherein said second component is operative to generate a first output value based on said input signal, wherein said conversion module comprises a queuing system that captures and sequences trigger signals comprising asynchronous signals and clock signals, said queuing system comprising a plurality of queues that hold an index for each of said trigger signals, a vector mask for each of said trigger signals, a value to which each of said trigger signals transitions, and values of non-trigger signals, and
wherein said first component is further operative to generate a second output value using inputs and outputs from said integrated circuit, and wherein said simulator is further operative to perform a comparison of said first output value and said second output value to verify operation of said integrated circuit against operation of said first component.

2. The system of claim 1, further comprising a monitoring circuit, wherein said second output value is captured by said monitoring circuit.

3. The system of claim 2, wherein said second output value is captured responsive to detecting a change in a signal at said integrated circuit, and wherein said signal is selected from a group consisting of: a clock signal, a synchronous signal, and an asynchronous signal.

4. The system of claim 1, wherein said simulator is further operative to report results of said comparison, and wherein said results comprise at least one element selected from the group consisting of: at least one expected value, said first output value, said second output value, at least one time associated with a simulation performed by said simulator, at least one signal name, and at least one signal location associated with said second component.

5. The system of claim 1, wherein said integrated circuit comprises a programmable logic device, and wherein said second component comprises reconfigurable logic of said programmable logic device.

6. The system of claim 1, wherein said integrated circuit comprises a programmable logic device operative to implement at least one macro design, and wherein said comparison is useful for detecting a fault in said macro design.

7. The system of claim 1, wherein said input value is received at said second component as part of an input vector of a test sequence.

8. The system of claim 7, wherein said simulator is further operative to convert a plurality of values into said test sequence.

9. The system of claim 8, wherein said simulator is further operative to:
access said trigger signals;
generate a plurality of input vectors based on said trigger signals, wherein each input vector of said plurality of input vectors is associated with a respective trigger signal of said trigger signals; and
serially communicate said plurality of input vectors as said test sequence.

10. The system of claim 1, wherein said interface component is further operative to communicate said second output value from said integrated circuit to said simulator.

11. A design under test simulation system comprising:
a processor operative to execute a hardware description language (HDL) simulator for said design under test; and
a component comprising an integrated circuit implementing said design under test and coupled to said processor, wherein in response to said component receiving said input value, said component generates a first output value based on said input value;
said simulator operative to queue trigger signals comprising asynchronous signals and clock signals in a queuing system, said queuing system comprising a first queue that holds an index for each of said trigger signals, a second queue that holds a vector mask for each of said trigger signals, a third queue that holds a value to which each of said trigger signals transitions, and a fourth queue that holds values of non-trigger signals, said simulator further operative to generate a second output value using inputs and outputs from said integrated circuit and to access said first output value to perform a comparison of said first output value and said second output value, said comparison useful for verifying operation of said integrated circuit against operation of said simulator.

12. The simulation system of claim 11, further comprising a monitoring circuit operative to capture said second output value.

13. The simulation system of claim 11, wherein said second output value is captured in response to detecting a change in a signal at said integrated circuit, wherein said signal is selected from a group consisting of: a clock signal, a synchronous signal, and an asynchronous signal.

14. The simulation system of claim 11, wherein said simulator receives said input value responsive to detecting said input value at an input of said component.

15. The simulation system of claim 11, wherein said simulator is further operative to report results of said comparison, and wherein said results comprise at least one element selected from the group consisting of: at least one expected value, said first output value, said second output value, at least one time associated with a simulation performed by said simulator, at least one signal name, and at least one signal location associated with said second component.

16. The simulation system of claim 11, wherein said integrated circuit comprises a programmable logic device, and wherein said component comprises reconfigurable logic of said programmable logic device.

17. The simulation system of claim 11, wherein said integrated circuit comprises a programmable logic device operative to implement at least one macro design, and wherein said debugging comprises detecting a fault in said macro design.

18. The simulation system of claim 11, wherein said input value is part of an input vector of a test sequence.

19. The simulation system of claim 18, wherein said simulator is further operative to convert a plurality of values into said test sequence.

20. The simulation system of claim 19, wherein said simulator is further operative to: access said trigger signals; generate a plurality of input vectors based on said trigger signals, wherein each input vector of said plurality of input vectors is associated with a respective trigger signal of said trigger signals; and serially communicate said plurality of input vectors as said test sequence.

* * * * *